United States Patent
Laurent-Michel et al.

(10) Patent No.: US 9,634,701 B2
(45) Date of Patent: Apr. 25, 2017

(54) PHASE NOISE SUPPRESSION

(71) Applicant: Maxlinear, Inc., Carlsbad, CA (US)

(72) Inventors: Stephane Laurent-Michel, Carlsbad, CA (US); Curtis Ling, Carlsbad, CA (US)

(73) Assignee: Maxlinear, Inc., Carlsbad, CA (US)

( * ) Notice: Subject to any disclaimer, the term of this patent is extended or adjusted under 35 U.S.C. 154(b) by 0 days.

(21) Appl. No.: 15/172,467

(22) Filed: Jun. 3, 2016

(65) Prior Publication Data

US 2016/0285488 A1 Sep. 29, 2016

Related U.S. Application Data

(63) Continuation of application No. 14/586,345, filed on Dec. 30, 2014, now Pat. No. 9,362,965.

(60) Provisional application No. 61/921,842, filed on Dec. 30, 2013.

(51) Int. Cl.
*H04B 1/10* (2006.01)
*H04L 5/00* (2006.01)
*H04B 17/00* (2015.01)
*H04L 1/24* (2006.01)
*H04L 27/00* (2006.01)

(52) U.S. Cl.
CPC ....... *H04B 1/1027* (2013.01); *H04B 17/0085* (2013.01); *H04L 1/24* (2013.01); *H04L 5/00* (2013.01); *H04L 5/0048* (2013.01); *H04L 27/0006* (2013.01)

(58) Field of Classification Search
CPC ..... H04L 5/0048; H04L 27/0006; H04L 1/24; H04B 1/1027; H04B 17/0085
See application file for complete search history.

(56) References Cited

U.S. PATENT DOCUMENTS

| | | | |
|---|---|---|---|
| 4,675,880 A | 6/1987 | Davarian | |
| 6,005,640 A * | 12/1999 | Strolle | H04L 27/0008 348/555 |
| 7,620,112 B2 * | 11/2009 | Tang | H04L 27/2639 370/210 |
| 8,416,836 B2 * | 4/2013 | Kirshenbaum | H04L 27/2647 375/141 |
| 8,989,762 B1 | 3/2015 | Negus | |
| 2003/0032424 A1 | 2/2003 | Judd | |

(Continued)

*Primary Examiner* — Sophia Vlahos
(74) *Attorney, Agent, or Firm* — McAndrews, Held & Malloy, Ltd.

(57) ABSTRACT

A system comprises a modulator circuit, a test signal generator circuit, and a control circuit. The modulator circuit is operable to generate a data-carrying signal based on a reference signal. The test signal generator circuit is operable to generate a test signal based on the reference signal. The control circuit is operable to determine current status of a microwave backhaul link. The control circuit is operable to configure a nominal frequency at which the test signal generator circuit generates the test signal based on the determined status of the microwave backhaul link. The control circuit is operable to determine an amount of whitespace to have on either side of the test signal based on the current status of the microwave backhaul link. The control circuit is operable to configure the modulator circuit such that the data-carrying signal has the determined amount of whitespace surrounding the nominal frequency of the test signal.

16 Claims, 6 Drawing Sheets

(56) References Cited

U.S. PATENT DOCUMENTS

| | | |
|---|---|---|
| 2005/0136980 A1 | 6/2005 | Kim |
| 2007/0147485 A1 | 6/2007 | Sakamoto et al. |
| 2008/0233879 A1* | 9/2008 | Sasaki .................... H04B 1/707 |
| | | 455/42 |
| 2008/0274732 A1 | 11/2008 | Boutigny et al. |
| 2009/0023462 A1 | 1/2009 | Dent |
| 2009/0207945 A1 | 8/2009 | Sasaki et al. |
| 2010/0240327 A1 | 9/2010 | Lambrecht |
| 2012/0155887 A1 | 6/2012 | Youn et al. |
| 2012/0207048 A1 | 8/2012 | Kim |
| 2013/0089042 A1 | 4/2013 | Negus |
| 2013/0229309 A1 | 9/2013 | Thomas et al. |
| 2014/0031072 A1 | 1/2014 | Koorapaty et al. |
| 2015/0215854 A1 | 7/2015 | Ling |
| 2015/0230105 A1 | 8/2015 | Negus et al. |

\* cited by examiner

PHASE NOISE SUPPRESSION

PRIORITY CLAIM

This application is a continuation of U.S. patent application Ser. No. 14/586,345 filed Dec. 30, 2014 (now U.S. Pat. No. 9,362,965), which claims the benefit of U.S. provisional patent application 61/921,842 filed Dec. 30, 2013, now expired, which is hereby incorporated herein by reference in its entirety.

BACKGROUND

Conventional approaches to microwave backhaul networks can be inefficient and suffer from poor performance. Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Systems and methods are provided for phase noise suppression in microwave backhaul networks, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.). As used herein, "microwave" frequencies range from approximately 300 MHz to 300 GHz and "millimeter wave" frequencies range from approximately 30 GHz to 300 GHz. Thus, the "microwave" band includes the "millimeter wave" band.

Figure 1:
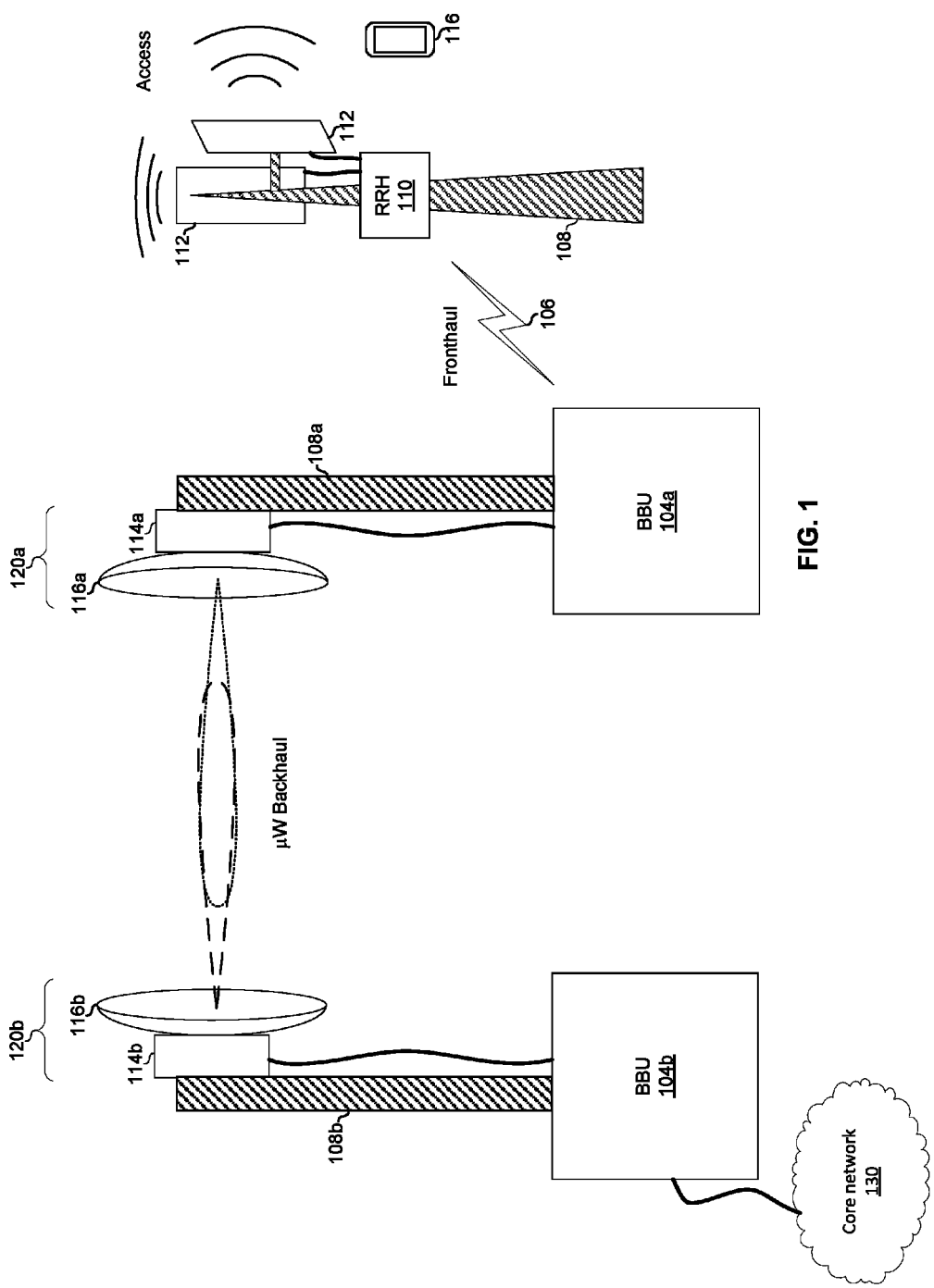
FIG. 1 is a diagram illustrating a wireless network with microwave backhaul.

FIG. 1 is a diagram illustrating a wireless network with microwave backhaul. Shown is a tower 108 to which mobile access network antennas 112 and remote radio head 110 are attached, baseband units 104a and 104b, a tower 108a to which microwave backhaul assembly 120a is attached, and a tower 108b to which microwave backhaul assembly 120b is attached. Although the depicted microwave link is used for backhauling mobile (i.e., "cellular") traffic, in other implementations the microwave backhaul assemblies 120a and 120b may backhaul traffic of other networks (e.g., television and/or radio distribution networks, non-cellular mobile networks, etc.) instead of, or in addition to, traffic of the mobile network.

The antennas 112 are configured for radiating and capturing signals of an access network (e.g., 3G, 4G LTE, etc., signals to/from mobile handsets).

For an uplink from a mobile handset 116 to the core network 130, the antennas 112 receive signals from the handset and convey them to the remote radio head 110. The remote radio head 110 processes (e.g., amplifies, downconverts, digitizes, filters, and/or the like) the signals received from the antennas 112 and transmits the resulting signals (e.g., downconverted I/Q signals) to the baseband unit 104a via fronthaul link 106. The baseband unit 104a processes, as necessary, (e.g., demodulates, packetizes, modulates, and/or the like) the signals received via fronthaul link 106 for conveyance to the microwave backhaul assembly 120a. The backhaul assembly 120a processes, as necessary (e.g., upconverts, filters, beamforms, and/or the like), the signals from baseband unit 104a for transmission via the antenna 116a. Microwave assembly 120b receives the microwave signal sent by 120a, processes the signal as necessary (e.g., downconverts, filters, beamforms, and/or the like) for conveyance to the baseband unit 104b, and conveys the signal to the baseband unit 104b. The baseband unit 104b processes the received signal as necessary for conveyance into the cellular service provider core network 130 and then transmits it into the core network 130.

For a downlink from the core network to the mobile handset, the baseband unit 104b processes, as necessary, data received from the core network 130 for conveyance to the assembly 120b, and then conveys it to the assembly 120b. The assembly 120b processes, as necessary (e.g., upconverts, filters, beamforms, and/or the like), the signals from baseband unit 104b for transmission via the antenna 116b. Microwave assembly 120a receives the microwave signal sent by 120b, and processes it as necessary (e.g., downconverts, filters, beamforms, and/or the like) for conveyance to the baseband unit 104a. The baseband unit 104a processes the signal from 120a as necessary (e.g., demodulates, packetizes, modulates, and/or the like) for conveyance to remote radio head 110 via fronthaul link 106. The remote radio head 110 processes, as necessary (e.g., upconverts, filters, amplifies, and/or the like), signals received via fronthaul link 106 for transmission via antennas 112.

In an example implementation, processing performed by the microwave backhaul assemblies 120a and 120b during transmission comprises inserting a test signal as described below. In an example implementation, processing performed by the microwave backhaul assemblies 120a and 120b during reception comprises detection of the test signal and removal of phase noise using the detected test signal.

Figure 2:
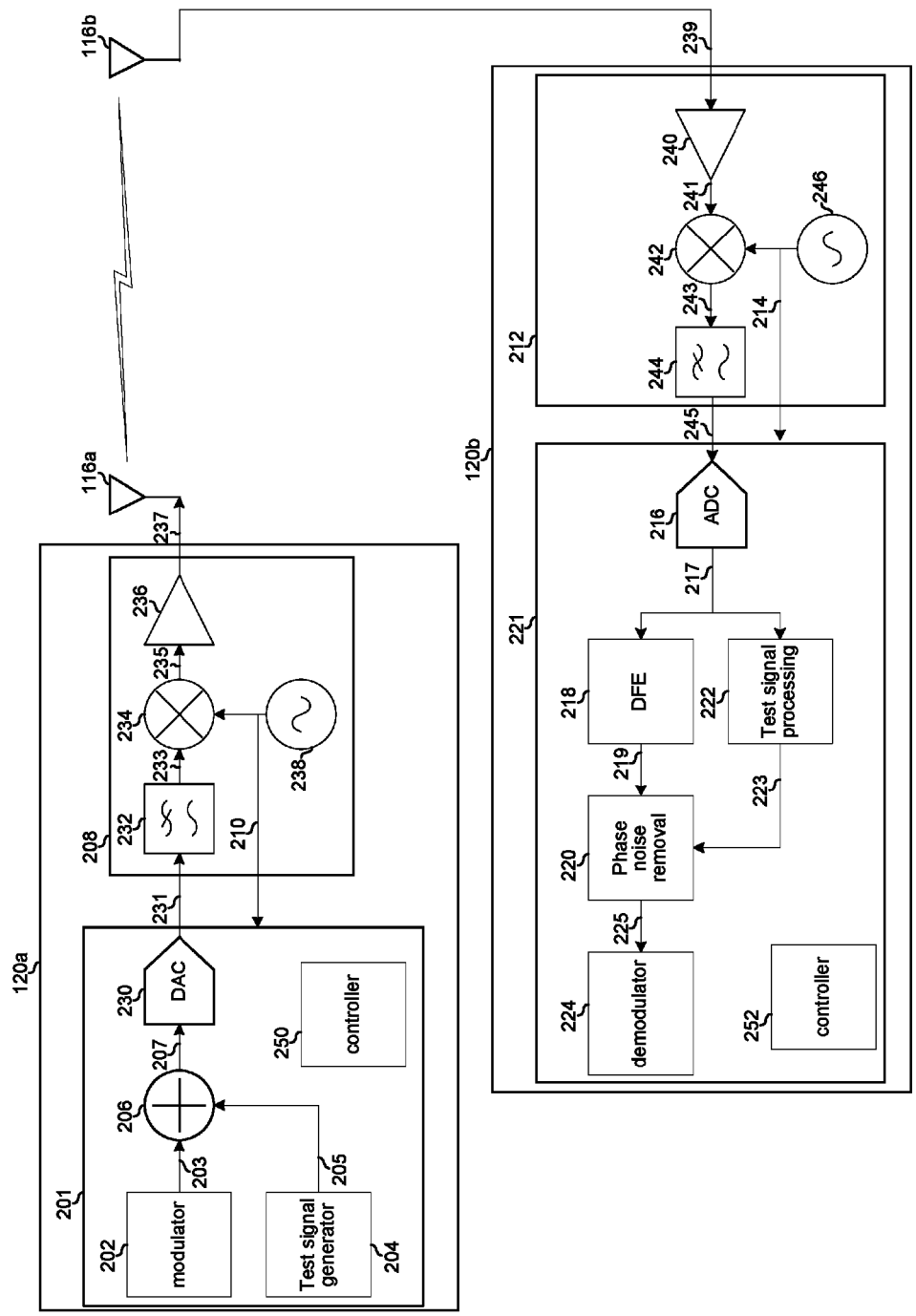
FIG. 2 depicts example circuitry of microwave backhaul assemblies such as the one shown in FIG. 1.

FIG. 2 depicts example circuitry of microwave backhaul assemblies such as the one shown in FIG. 1. Shown in FIG. 2 is circuitry of assembly 120a and circuitry of assembly 120b. For simplicity of illustration, only circuitry for a unidirectional link from 120a to 120b is shown. In an example bidirectional implementation, however, 120a may also comprise the components shown in 120b and visa-versa.

Shown in the example assembly 120a is baseband processing circuitry 201 that comprises a modulator circuit 202, a test signal generation circuit 204, a test signal insertion circuit 206, a controller 250, and a digital to analog converter 230. Also shown in assembly 120a is an analog front-end 208 that comprises a filter 232, upconverter 234, a power amplifier 236, and a local oscillator 238.

The controller 250 comprises circuitry operable to manage operations of the assembly 120a. The controller 250 may, for example, execute instructions to implement an operating system of the controller 250 and generate control signals for controlling operations of the various components of the assembly 120a.

The modulator 202 comprises circuitry operable to modulate data onto one or more carriers to generate the modulated baseband signal 203. Operations performed by the modulator 202 may comprise, for example, bit-to-symbol mapping, interleaving, and forward error correction encoding. The bandwidth of the signal 203 may be less than an amount of bandwidth allocated to the microwave link between assemblies 120a and 120b by at least an amount of bandwidth reserved for use by the test signal, as described below.

The test signal generation circuit 204 comprises circuitry operable to generate signal 205. The test signal generation circuit 205 may comprise, for example, a phase locked loop operable to generate a single tone at a determined frequency. The signal 210 may serve as a reference frequency for generating the signal 205.

The test signal insertion circuit 206 comprises circuitry operable to combine the signal 205 and the signal 203 to generate signal 207. The test signal insertion circuit 206 may comprise, for example, an adder.

The digital-to-analog converter 230 comprises circuitry operable to convert the digital signal 207 to a corresponding analog signal 231.

The filter 232 comprises circuitry operable to attenuate undesired frequencies (e.g., aliases generated by the DAC 230) in the signal 231 to generate the signal 233.

The upconverter 234 is operable to upconvert the signal 233 from baseband to a microwave frequency assigned to the microwave backhaul link between assemblies 120a and 120b.

The power amplifier 236 comprises circuitry operable to increase the power of signal 235, resulting in the signal 237 which is transmitted via the antenna 116a.

The local oscillator 238 comprises circuitry operable to generate a signal 210 at a determined reference frequency. The local oscillator 238 may comprise, for example, a crystal oscillator. In the example implementation shown, the signal 210 serves as a reference for the analog front end 208 and the baseband processing circuitry 201.

Shown in the example assembly 120b is baseband processing circuitry 221 that comprises a controller 252, a demodulator circuit 224, a test signal processing circuit 222, phase noise removal circuit 220, digital front end 218, and full-spectrum capture (FSC) analog-to-digital converter (ADC) circuit 216. Also shown in assembly 120b is an analog front-end 212 that comprises a low noise amplifier 240, a downconverter 242, a filter 244, and a local oscillator 246.

The controller 252 comprises circuitry operable to manage operations of the assembly 120b. The controller 252 may, for example, execute instructions to implement an operating system of the controller 252 and generate control signals for controlling operations of the various components of the assembly 120b.

The demodulator circuit 224 comprises circuitry operable to recover data that has been modulated onto a carrier signal. Operations performed by the demodulator 224 may comprise, for example, symbol-to-bit demapping, deinterleaving, and forward error correction decoding.

The low noise amplifier 240 comprises circuitry operable to increase the power of signal 239 received via antenna 116b, resulting in the signal 241.

The downconverter 242 is operable to downconvert the signal 241 to baseband from a microwave frequency assigned to the microwave backhaul link between assemblies 120a and 120b.

The filter 244 comprises circuitry operable to attenuate undesired frequencies (e.g., mixer products generated by the downconverter 242) in this signal 243 to generate the signal 245.

The local oscillator 246 comprises circuitry operable to generate a signal 214 at a determined reference frequency. The local oscillator 246 may comprise, for example, a crystal oscillator. In the example implementation shown in FIG. 2, the signal 214 serves as a reference for the analog front end 212 and the baseband processing circuitry 221.

Figure 3:
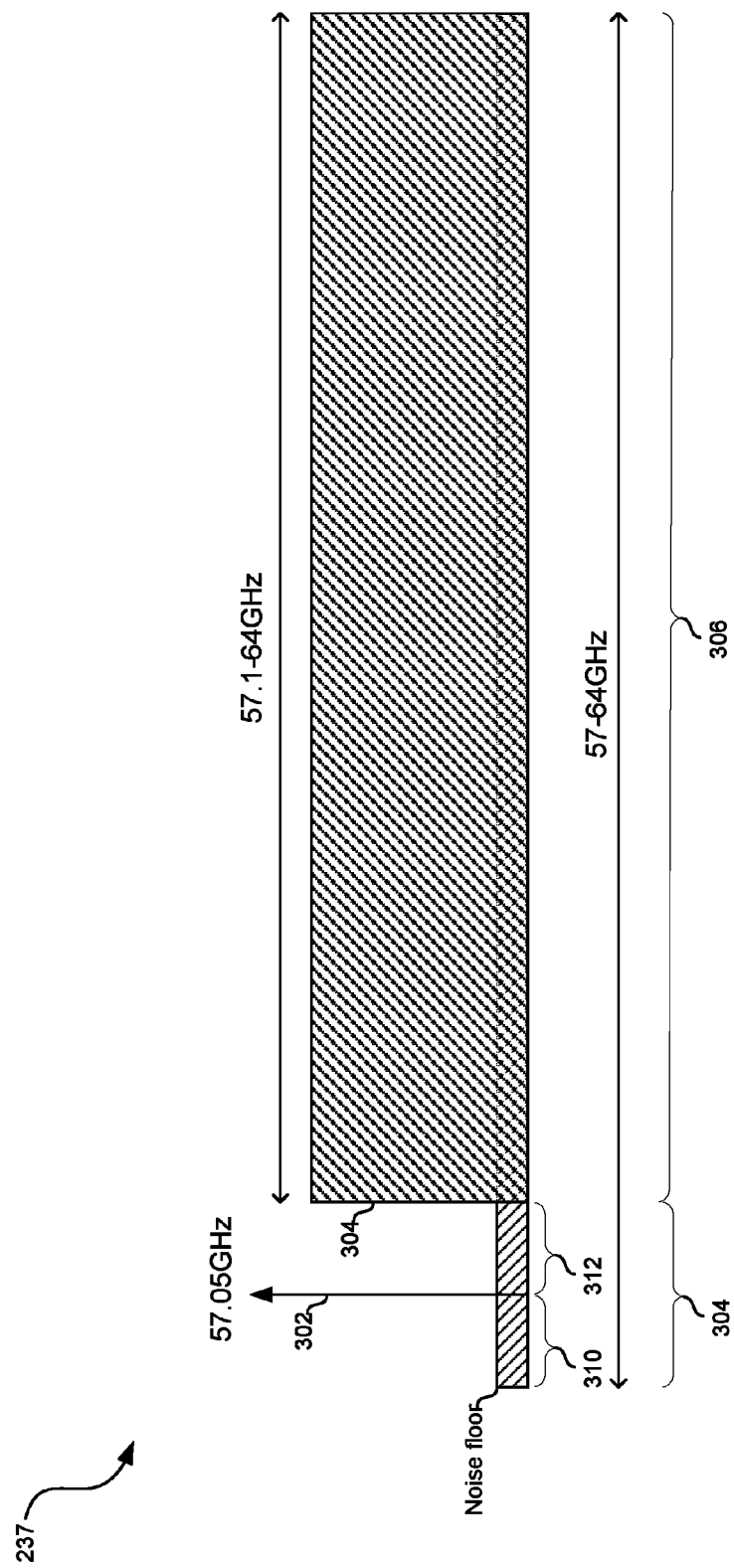
FIG. 3 shows a spectrum of a microwave backhaul link in accordance with an example implementation.

The analog-to-digital converter 216 comprises circuitry operable to convert the analog signal 245 to a corresponding digital signal 217. In an example implementation, the ADC 216 may comprise a single ADC operable to concurrently digitize signals across the entire spectrum allocated to the microwave backhaul link between assemblies 120a and 120b. An example of such a spectrum is shown in FIG. 3.

Returning to FIG. 2, the digital front end 218 comprises circuitry operable to condition the signal 217, resulting in signal 219. Such conditioning may comprise, for example, I/Q mismatch correction, linearization, equalization, and/or the like.

The test signal processing circuit 222 comprises circuitry operable to recover the test signal 205 from the signal 217 and determine a phase of the recovered test signal. The determined phase (or a characterization thereof) is then output as signal 223. The circuit 222 may comprise, for example, a bandpass filter that selects a determined frequency band allocated to the test signal 205, and a phase detector that tracks the phase of the test signal present in the output of the bandpass filter.

The phase noise removal circuit 220 is operable to remove/correct phase noise from the signal 219 based on the phase signal 223. The result is signal 225 which has less phase noise than signal 219.

In operation, the test signal generator circuit 204 generates a low-phase-noise test signal 205 and the modulator 202 generates a data-carrying signal 203. The circuit 206 then combines the test signal 205 with the data-carrying signal 203 to generate signal 207. The signal 207 is then converted to analog signal 231 and processed by analog front end 208, resulting in microwave signal 237. In the combined signal 207, the amount of bandwidth allocated for the test signal 205 may be substantially larger than the bandwidth of the signal 205. FIG. 3 illustrates one example implementation. The values presented in FIG. 3 are purely for illustration and not intended to be limiting.

Referring to FIG. 3, the microwave backhaul link between assemblies 120a and 120b is assigned to the 57.1 GHz to 64 GHz band. The microwave signal 237 comprises a portion 304 and a portion 306. The portion 304 comprises a component 302 corresponding to test signal 305 and whitespace 310 and 312. The portion 306 is a data portion corresponding to data-carrying signal 203. The component 302 is a tone having a bandwidth that, ideally, is infinitesimally small, but practically may have a bandwidth on the order of kHz or a few MHz, for example. The bandwidth 304 allocated for use by the component 302, however, has a bandwidth of 100 MHz. The component 302 is nominally at 57.05 GHz, but this frequency may vary as a result of, for example, phase noise introduced by local oscillator 238. The whitespace 310 and 312 bordering the component 302 allows the frequency of the component 302 to drift without interfering with, or becoming obscured by, the signal component 302 or other adjacent signals (not shown in FIG. 3). In this manner, the test signal 205 may be readily recovered at the receiver and its phase (or characterization thereof) determined. The phase of signal 205 may, in turn, be used to correct/suppress phase noise in the data-carrying signal 203, since signals 203 and 205 are referenced to the same oscillator 238.

Referring back to FIG. 2, the signal 237 is received via antenna 116b, amplified by LNA 240, downconverted to baseband by downconverter 242 based on reference signal 214, filtered by filter 244, and then converted to digital representation as signal 217. The DFE 218 selects the data portion 306 of signal 217 and conditions it for output as signal 219. For example, for the signal of FIG. 3, the DFE 218 may select the data portion 306 of signal 217 using a filter with a passband of 57.1 GHz to 64 GHz. The test signal processing circuit 222 selects the test signal portion 304 of the signal 217, analyzes it to determine the phase of the test signal 205, and outputs the phase as signal 223. For example, for the signal of FIG. 3, the test signal processing circuit 222 may select the test signal portion 304 of signal 217 using a filter with a passband of 57 GHz to 57.1 GHz. The phase noise removal circuit 220 uses the signal 223 to correct/suppress phase noise in the signal 219, resulting in signal 221.

In an example implementation, the amount of whitespace added around the test signal may be dynamically controlled to trade-off power consumption and/or bandwidth utilization with needed/desired phase noise accuracy. For example, where one or more performance metrics such as signal-to-noise ratio (SNR), symbol error rate (SER), bit error rate (BER), and/or the like indicate that more phase noise can be tolerated, the test signal may be disabled and/or the amount of whitespace around it may be decreased, whereas an indication that less phase noise is needed may be met with an enabling of the test signal and/or increasing of the white space. Such performance metric(s) may, for example, be measured by assembly 120b and fedback to assembly 120a via a control channel, for example. At any given time the system may continuously and/or periodically adjust the presence of the tone and/or the amount of whitespace around the tone to seek an optimum balance between bandwidth utilization, power consumption, and one or more desired performance metrics.

Figure 4:
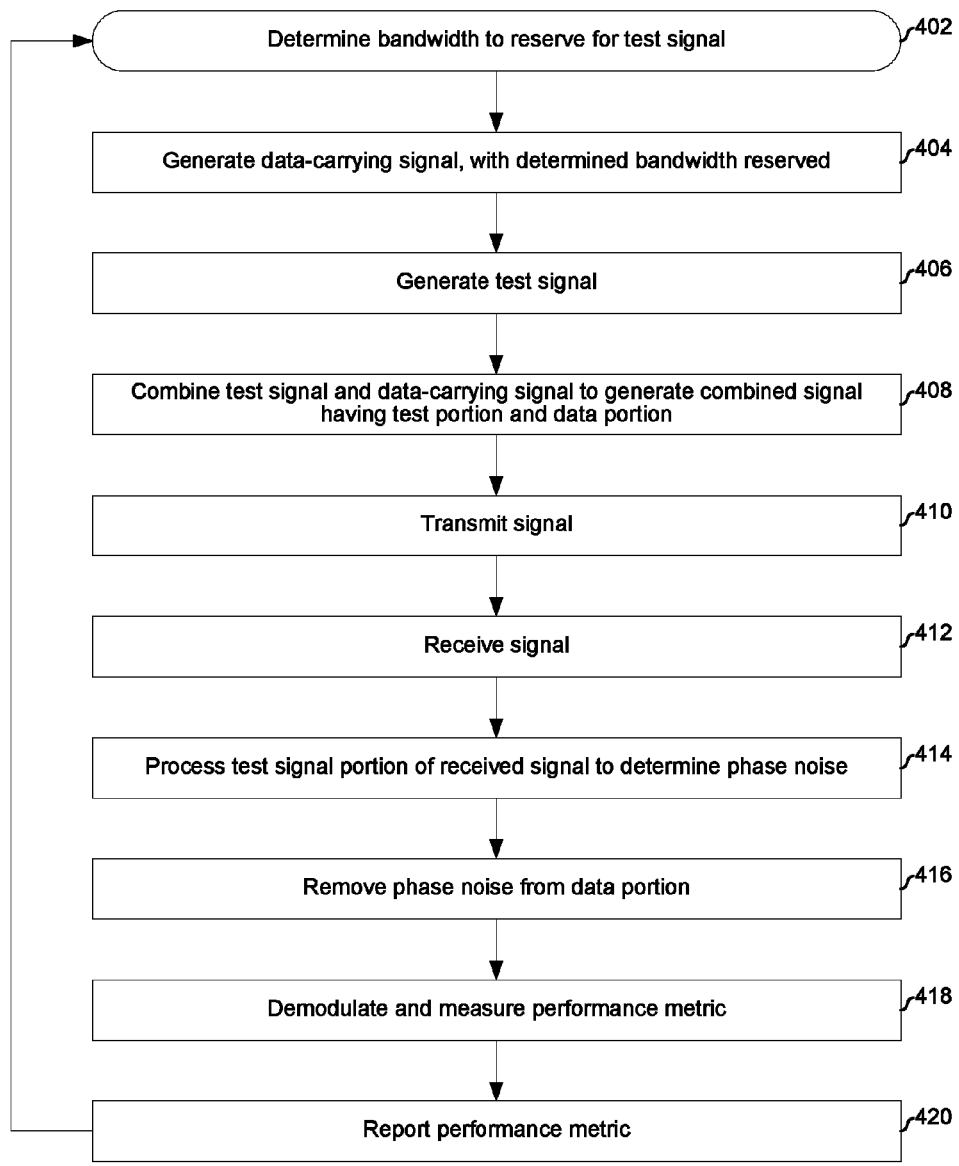
FIG. 4 is a flowchart showing an example process for phase noise suppression in accordance with an example implementation of this disclosure.

FIG. 4 is a flowchart showing an example process for phase noise suppression in accordance with an example implementation of this disclosure.

In block 402, an amount of bandwidth to be reserved for the test signal 205 is determined (e.g., by controller 250 or 252). The determination may be based on a performance metric measured by circuitry of the assembly 120b. In block 404, the modulator 202 generates a data-carrying signal 203 having a bandwidth that accounts for the bandwidth determined in block 402. In block 406, the test signal generator generates a test signal 205. In block 408, the test signal insertion circuitry combines the test signal 205 generated in block 406 with the data-carrying signal 203 generated in block 404, resulting in a combined signal 207 having a test portion (e.g., 304) and a data portion (e.g., 306). In block 410, the combined signal is converted to analog, processed by front-end 208, and transmitted onto the microwave backhaul link.

In block 412, the signal transmitted in block 410 is received and processed via front-end 212 and ADC 216. In block 414, the test signal portion of the received signal is processed by test signal processing circuit 222 to determine a phase of a test signal component of the received signal. In an example implementation, a magnitude and/or derivative of measured phase noise of the test signal may be stored and/or reported as a performance metric. In block 416, the phase noise removal circuit uses the phase determined in block 414 to suppress/correct phase noise in a data portion of the received signal. In block 418, the phase-noise-suppressed output of the phase noise removal circuit 220 is demodulated by demodulator 224. In block 420 one or more performance metrics (e.g., SNR, SER, BER, etc.) are determined (e.g., by demodulator 224 or controller 252) based on the demodulated signal.

Figure 5:
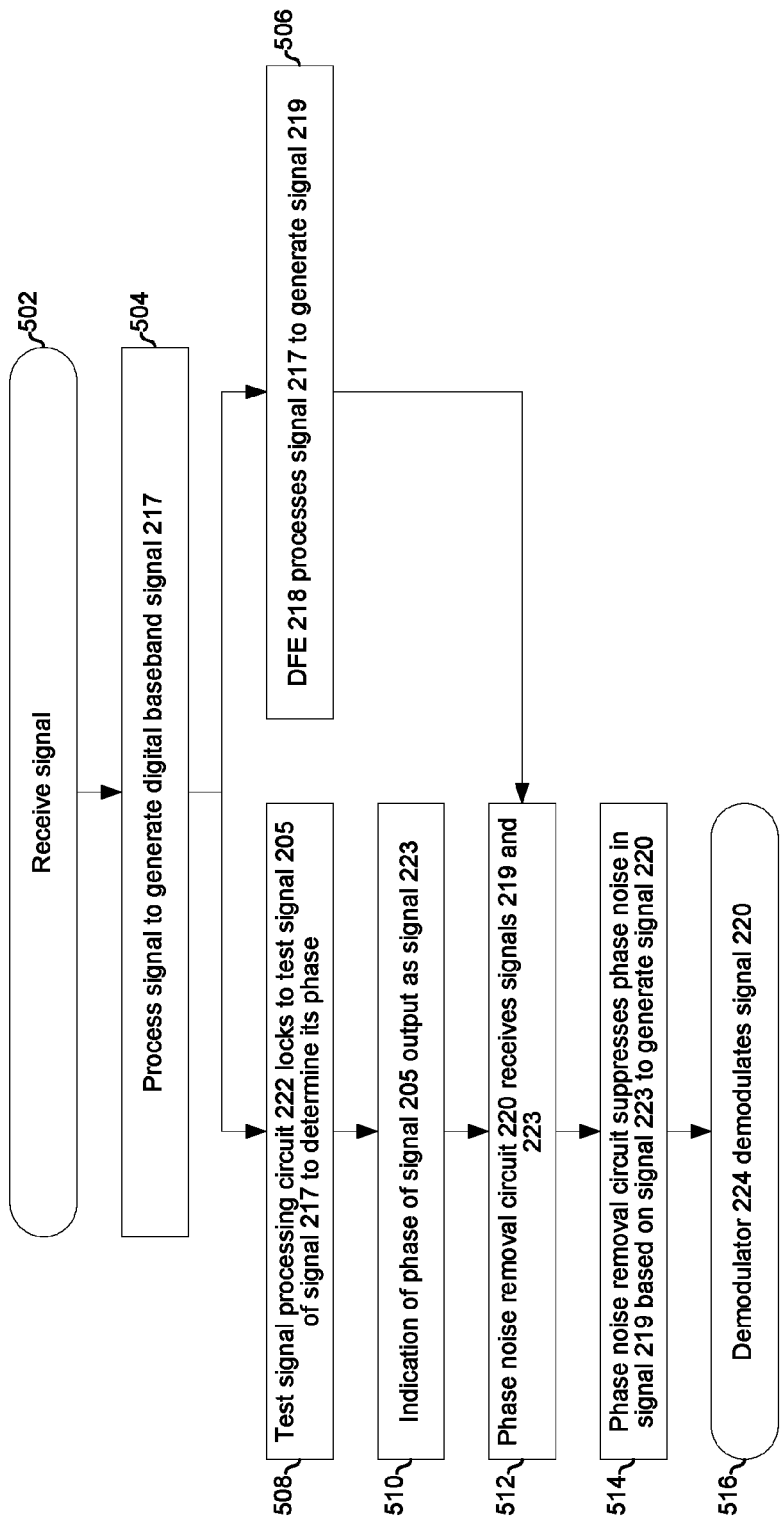
FIG. 5 is a flowchart showing an example process for phase noise suppression in accordance with an example implementation of this disclosure.

FIG. 5 is a flowchart showing an example process for phase noise suppression in accordance with an example implementation of this disclosure. In block 502, signal 239 is received via antenna 116b. In block 504, signal 239 is processed by front-end 212 and ADC 216 to generate digital baseband signal 217. In block 506, DFE 218 processes signal 217 to generate signal 219. In block 508, test signal processing circuit 222 locks to test signal 205 of signal 217 to determine its phase. In block 510, an indication of the phase determined in block 508 is output by test signal processing circuit 222 as signal 223. In block 512, phase noise removal circuit 220 receives signals 219 and 223. In block 514, phase noise removal circuit suppresses phase noise in signal 219 based on signal 223 to generate signal 225. In block 516, demodulator 224 demodulates signal 225.

Figure 6:
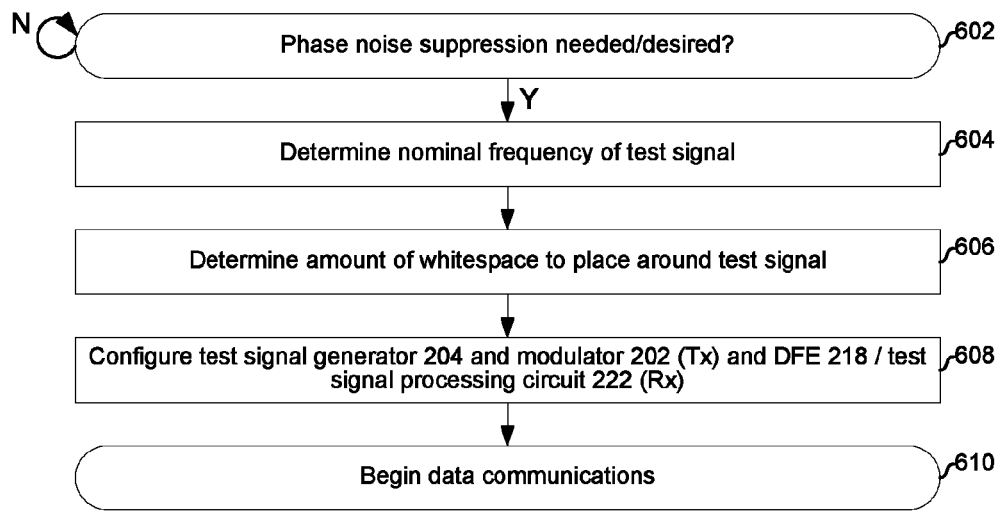
FIG. 6 is a flowchart showing an example process for configuring microwave backhaul assemblies for phase noise cancellation in accordance with an example implementation of this disclosure.

FIG. 6 is a flowchart showing an example process for configuring microwave backhaul assemblies for phase noise cancellation in accordance with an example implementation of this disclosure. The process of FIG. 6 may, for example, take place during link setup and/or during an inter-frame time. In block 602, it is determined whether phase noise suppression is needed or desired. For example, if link margins are otherwise very high (e.g., due to favorable atmospheric conditions) performance targets may be met without the need for phase noise suppression. If so, the process advances to block 604. In block 604, a nominal frequency at which to place the test signal is determined. This determination may be based on, for example, the band(s) which have been allocated to the microwave backhaul link and channel conditions (e.g., frequency-selective fading, adjacent interferers, etc.). In block 606, an amount of whitespace to reserve on either side of the test signal is determined. This determination may be made based on, for example, the accuracy with which it is desired or necessary to suppress phase noise. In block 608, the assemblies are configured based on the determined test signal frequency and amount of whitespace. This may include configuring the test signal generator 204 and modulator 202 in the transmitter and test signal processing circuit in the receiver. In block 610, once the backhaul assemblies are configured, data communications can begin.

In accordance with an example implementation of this disclosure, a system (e.g., assembly 120a) comprises: a local oscillator circuit (e.g., 238) operable to generate a reference signal (e.g., 210); a modulator circuit (e.g., 202) operable to generate a data-carrying signal (e.g., 205) using the reference signal; a test signal generator circuit (e.g., 204) operable to generate a test signal using the reference signal, wherein the test signal has a first bandwidth; and a test signal insertion circuit (e.g., 206) operable to combine the data-carrying signal and the test signal to generate a combined signal (e.g., 207), wherein an amount of bandwidth in the combined signal allocated to the test signal is greater than the first bandwidth such that a component (e.g., corresponding to 302 prior to upconversion) of the combined signal corresponding to the test signal is bordered by whitespace (e.g., corresponding to 310 and 312 prior to upconversion). The bandwidth in the combined signal allocated to the test signal (e.g., on the order of tens or hundreds of megahertz) may be at least one order of magnitude larger than the first bandwidth (e.g., on the order of kilohertz, tens of kilohertz, hundreds of kilohertz, or megahertz). The system may comprise a digital-to-analog converter (e.g., 230) operable to convert the combined signal to a corresponding analog signal. The system may comprise an analog front-end operable to upconvert the combined signal to a microwave frequency signal (e.g., 237) and transmit the microwave frequency signal. A bandwidth of the microwave frequency signal (e.g., on the order of gigahertz) is at least one order of magnitude larger than the bandwidth in the combined signal allocated to the test signal (e.g., on the order of tens or hundreds of megahertz. The amount of bandwidth in the combined signal allocated to the test signal may vary (e.g., controlled by control signals from controller 250 to modulator 202) in response to variation of a performance metric measured for the combined signal.

In accordance with an example implementation of this disclosure, a system (e.g., assembly 120b) comprises: circuitry (e.g., front-end 212 and ADC 216) operable to receive a microwave frequency signal (e.g., 237) comprising a test signal portion (e.g., 304) and a data portion (e.g., 306), wherein the test signal portion comprises a test signal component (e.g., corresponding to 302 after downconversion to baseband) and whitespace (e.g., corresponding to 310 and 312 after downconversion to baseband) bordering the test signal component; a test signal processing circuit (e.g., 222) operable to select the test signal portion and process the test signal portion to generate a signal (e.g., 223) indicative of phase of the test signal component; and a phase noise removal circuit (e.g., 220) operable to correct phase noise in the data portion based on the signal indicative of phase of the test signal component. A bandwidth of the whitespace (e.g., on the order of hundreds of megahertz) may be at least one order of magnitude larger than a bandwidth of the test signal component (e.g., on the order of megahertz). A bandwidth of the microwave frequency signal (e.g., on the order of gigahertz) may be at least one order of magnitude larger than the bandwidth of the whitespace. The system may comprise circuitry (e.g., part of demodulator 224 and/or controller 252) operable to measure a performance metric for the microwave frequency signal.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein.

Accordingly, the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system comprising:
    a modulator circuit operable to generate a data-carrying signal based on a reference signal;
    a test signal generator circuit operable to generate a test signal based on the reference signal;
    a test signal insertion circuit operable to combine the data-carrying signal and the test signal to generate a combined signal; and
    control circuit operable to:
        determine current status of a microwave backhaul link according to a determination of a performance metric for the combined signal;
        configure a nominal frequency at which the test signal generator circuit generates the test signal based on the determined current status of the microwave backhaul link;
        determine an amount of whitespace to have on either side of the test signal based on the determined current status of the microwave backhaul link; and configure the modulator circuit such that the data-carrying signal has the determined amount of whitespace surrounding the nominal frequency of the test signal.

2. The system of claim 1, wherein the performance metric comprises one of: signal-to-noise ratio, symbol error rate, and bit error rate.

3. The system of claim 1, wherein the performance metric is an indication of phase noise.

4. The system of claim 1, comprising a digital-to-analog converter operable to convert the combined signal to a corresponding analog signal.

5. The system of claim 4, comprising an analog front-end operable to upconvert the combined signal to a microwave frequency signal and transmit the microwave frequency signal.

6. The system of claim 5, comprising:
a receive analog front-end circuit operable to receive the microwave frequency signal and convert the microwave frequency signal to an analog baseband signal;
an analog-to-digital converter operable to convert the baseband signal to a digital baseband signal;
a test signal processing circuit operable to:
select a first portion of the digital baseband signal that includes the whitespace and the test signal; and
process the first portion of the digital baseband signal to generate a signal indicative of phase of the test signal; and
a phase noise removal circuit operable to correct, based on the signal indicative of phase of the test signal, phase noise in a second portion of the digital baseband signal that does not include the whitespace or the test signal.

7. The system of claim 5, wherein:
a bandwidth of the microwave frequency signal is at least one order of magnitude larger than the bandwidth of the whitespace; and
the bandwidth of the whitespace is at least one order of magnitude larger than the bandwidth of the test signal.

8. The system of claim 1, wherein the modulator circuit, test signal generator circuit, and control circuit are integrated in a microwave backhaul assembly.

9. A method comprising:
generating, by a modulator circuit, a data-carrying signal based on a reference signal;
generating, by a test signal generator circuit, a test signal based on the reference signal;
combining, by a test signal insertion circuit, the data-carrying signal and the test signal to generate a combined signal;
determining, by a control circuit, current status of a microwave backhaul link by determining a performance metric for the combined signal;
configuring, by the control circuit, a nominal frequency at which the test signal generator circuit generates the test signal based on the determined current status of the microwave backhaul link;
determining, by the control circuit, an amount of whitespace to have on either side of the test signal based on the determined current status of the microwave backhaul link; and
configuring, by the control circuit, the modulator circuit such that the data-carrying signal has the determined amount of whitespace surrounding the nominal frequency of the test signal.

10. The system of claim 9, wherein the performance metric comprises one of: signal-to-noise ratio, symbol error rate, and bit error rate.

11. The system of claim 9, wherein the performance metric is an indication of phase noise.

12. The system of claim 9, comprising converting, by an digital-to-analog converter circuit, the combined signal to a corresponding analog signal.

13. The system of claim 12, comprising upconverting, by an analog front-end circuit, the combined signal to a microwave frequency signal and transmit, by the analog front-end circuit, the microwave frequency signal.

14. The system of claim 13, comprising:
receiving, via a receive analog front-end circuit, the microwave frequency signal;
converting, via the receive analog front-end circuit, the microwave frequency signal to an analog baseband signal;
converting, by an analog-to-digital converter circuit, the baseband signal to a digital baseband signal;
selecting, by a test signal processing circuit, a first portion of the digital baseband signal that includes the whitespace and the test signal; and
processing, by the test signal processing circuit, the first portion of the digital baseband signal to generate a signal indicative of phase of the test signal; and
correcting, by a phase noise removal circuit based on the signal indicative of phase of the test signal, phase noise in a second portion of the digital baseband signal that does not include the whitespace or the test signal.

15. The system of claim 13, wherein:
a bandwidth of the microwave frequency signal is at least one order of magnitude larger than the bandwidth of the whitespace; and
the bandwidth of the whitespace is at least one order of magnitude larger than the bandwidth of the test signal.

16. The system of claim 9, wherein the modulator circuit, test signal generator circuit, and control circuit are integrated in a microwave backhaul assembly.

* * * * *